United States Patent [19]

Houston

[11] Patent Number: 4,706,511
[45] Date of Patent: Nov. 17, 1987

[54] HIGH ANGLE LINK HINGE

[75] Inventor: John C. Houston, Erie, Pa.

[73] Assignee: American Sterilizer Company, Erie, Pa.

[21] Appl. No.: 822,370

[22] Filed: Jan. 27, 1986

[51] Int. Cl.$^4$ ............... F16H 21/44; A61G 13/00
[52] U.S. Cl. ........................... 74/105; 74/102; 269/325
[58] Field of Search ............... 74/105, 99 R, 102, 104; 269/325; 172/273, 275

[56] References Cited

U.S. PATENT DOCUMENTS

| | | | |
|---|---|---|---|
| 2,891,480 | 6/1959 | Marcum | 74/105 |
| 3,035,711 | 5/1962 | Rehnstrom | 74/105 |
| 3,349,877 | 10/1967 | Downs | |
| 3,643,904 | 2/1972 | McMullen | 74/105 X |
| 3,768,322 | 10/1973 | Eckert | 74/102 |
| 3,892,322 | 7/1975 | Drennhaus | 172/273 X |
| 3,982,741 | 9/1976 | Mitchell et al. | |
| 4,270,233 | 6/1981 | Mulligan | |
| 4,441,376 | 4/1984 | Tobey | 74/105 X |
| 4,458,800 | 7/1984 | Christenson | 74/105 X |
| 4,479,554 | 10/1984 | Kueker | 74/105 X |

OTHER PUBLICATIONS

"Linkage Design" from S. Molian, *The Design of Cam Mechanism and Linkages*.
J. Kimbrell & K. Hunt, "A Classification of Coupler--Line Envelopes from Hinged Four-Bar Linkages," *103 Journal of Mechanical Design 750* (Oct. 1981).
R. Strong and K. Waldron, "Joint Displacements in Linkage Synthesis Solutions," *101 Journal of Mechanical Design 477* (Jul. 1979).

Primary Examiner—Cornelius J. Husar
Assistant Examiner—Todd G. Williams
Attorney, Agent, or Firm—Robert D. Yeager; Christine R. Ethridge

[57] ABSTRACT

A linkage for transmitting torque includes a stationary member, a movable member rotatably mounted to the stationary member, an input link having one end rotatably mounted to the stationary member and a second end connected to a linear actuator and a coupler link. The coupler link is connected to the second end of an output link, preferably integral to the movable member. The moment applied to the input link by the linear actuator is transferred through the coupler link to the output link, or movable member. The angle of rotation of the output link is greater than the angle of rotation of the input link.

14 Claims, 11 Drawing Figures

4,706,511

HIGH ANGLE LINK HINGE

BACKGROUND OF THE INVENTION

1. Field of the Invention

This invention relates to hinge devices for transmitting torque, and more particularly, to such a hinge using links and pins as power transmission elements.

2. Description of the Prior Art

Surgical tables and hospital beds having articulating sections for posturing a patient are well-known. A variety of actuating means for articulating the sections have been developed. Mitchell et al. U.S. Pat. No. 3,982,741, which issued on Sept. 28, 1976 to Affiliated Products, Inc. discloses an operating table having movable sections actuatable by tandem connected hydraulic cylinders secured to the stationary portion of the table. The cylinders are connected to opposing sides of the sections by means of connecting links extending between two pivot connecting pins and depending actuator legs. U.S. Pat. No. 4,270,233 which issued on June 2, 1981 to Jack Mulligan describes an obstetric bed having moving sections. Links and pins are used to articulate the sections. Downs U.S. Pat. No. 3,349,877 which issued on Oct. 31, 1967 describes another variety of power transmission mechanism for use in adjustable beds.

The object of the present invention is to provide a hinge mechanism having power transmission components capable of articulating high loads through large angles.

A further object of the present invention is to provide such a hinge mechanism that is of minimal size.

SUMMARY OF THE INVENTION

The present invention provides a linkage for transmitting torque. In an apparatus having a first member rotatably connected at a joint to a second member, the linkage includes an input link having one end rotatably mounted to the second member and a second end; means for applying a moment to input link about its one end; an output link having one end rotatably mounted to the joint and second end, the output link being so operatively associated with the first member that the first member moves with the output link and a coupler link having a first end connected to the second end of the input link and a second end connected to the second end of the output link. The length of the input link is greater than the length of the output link so that rotation of the input link about its one end causes the coupler link to rotate the output link about its one end through a greater angle of rotation than that of the input link.

The output link may be integral to the first member. The moment applying means may be a fluid powered linear actuator, such as a cylinder having an extendable and retractable rod connected to the second end of the input link.

The first member may be a movable member and the second member may be a stationary member. Alternatively, the first member may be stationary and the second member may be movable.

The linkage preferably includes a stationary member having two first parallel spaced side walls, each of which have access openings, and a movable member having two second parallel spaced side walls rotatably mounted outboard of the first side walls of the stationary member. The input link is then preferably mounted to the stationary member between the two first side walls and the coupler link is pivotally mounted through the access openings in each first side wall to the second side walls of the movable member.

The coupler link preferably includes two link members each having a respective first end, the first ends being mounted on opposing outboard sides of the second end of the input link. The moment applying means, specifically the rod of the fluid powered linear actuator, includes a bifurcated end for mounting each first end of the link members to the second end of the input link.

BRIEF DESCRIPTION OF THE DRAWINGS

The present invention can better be understood if reference is made to the drawings in which.

DETAILED DESCRIPTION OF THE PREFERRED EMBODIMENT

The linkage 10 of the present invention is shown schematically and geometrically in the attached drawings. The linkage 10 is particularly well suited for articulating the movable sections of a multisectioned surgical table 12 (see FIG. 1) or an adjustable bed. It will be appreciated, however, that the linkage 10 can be used in a variety of applications.

Figure 1:
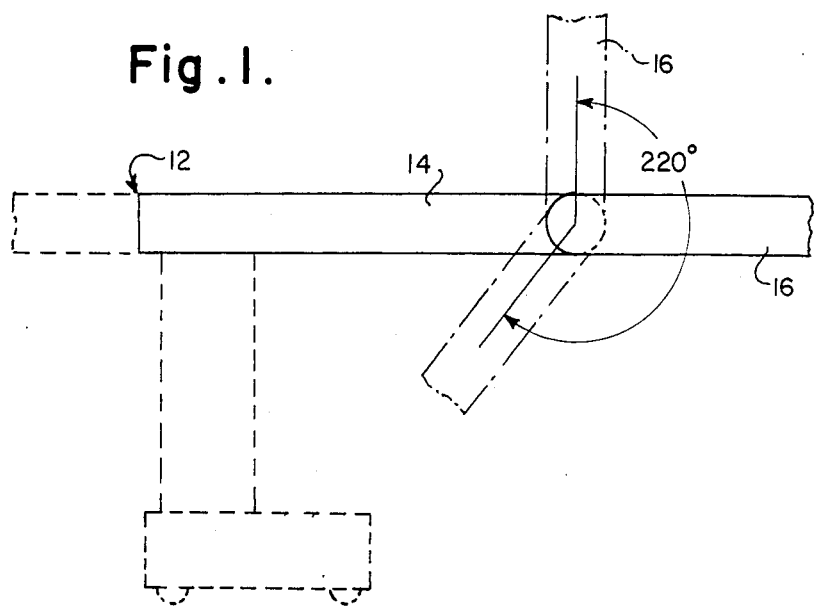
FIG. 1 is a schematic side elevation view of a surgical table showing the angle of rotation of the movable member relative to the stationary member.
Figure 2:
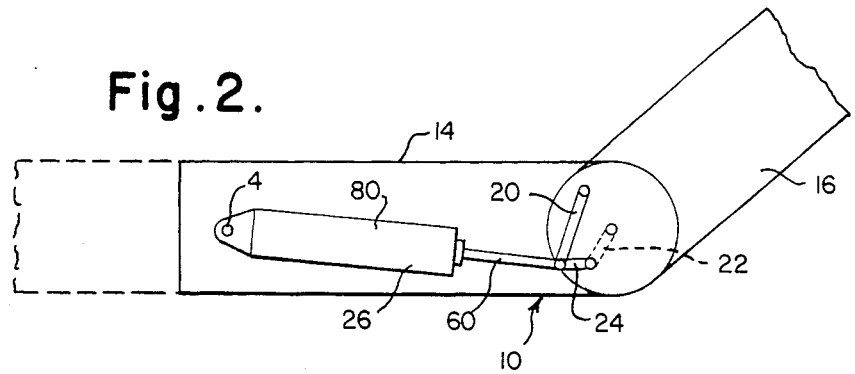
FIG. 2 is a side elevation view of one embodiment of the linkage of the present invention.
Figure 6A:
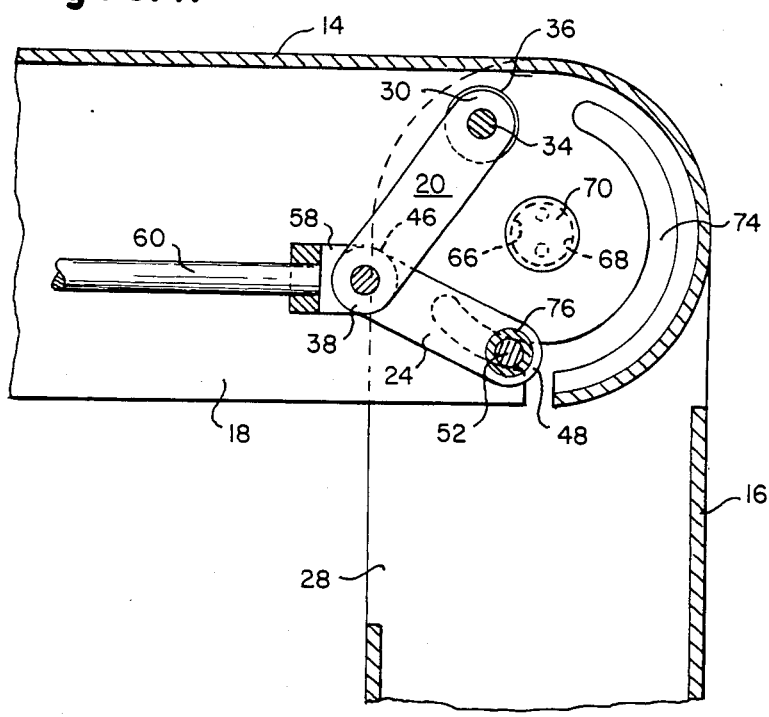
FIG. 6A is a longitudinal section view of the embodiment of FIG. 6 in the assembled state.

FIG. 1 illustrates a surgical table 12 having a first, movable section 16 and a second, stationary section 14. The linkage 10 includes an input link 20, an output link 22, a pair of coupler links 24 and an actuator 26. In an alternative embodiment, section 16 may be stationary and section 14 may be movable.

Figure 6:
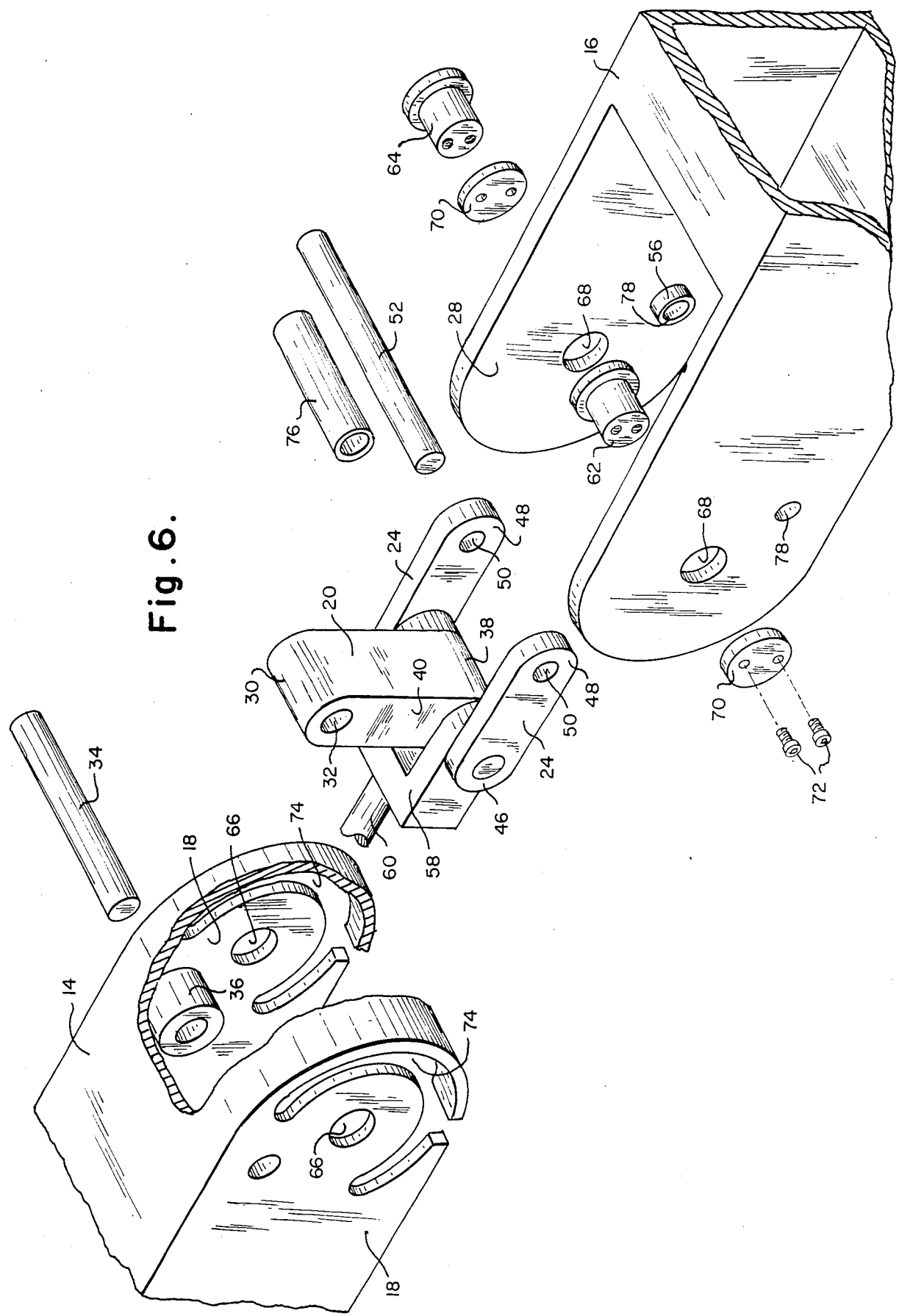
FIG. 6 is an exploded isometric view of the preferred embodiment of the linkage of the present invention.

Referring to FIG. 6, input link 20 includes one end 30 having a bore 32 therethrough to receive a rod 34 about which the input link 20 can rotate. The rod 34 is connected at each end to receiving members 36 in the side walls 18 of the stationary section 14. The other end 38 of input link 20 is connected on its outboard sides 40 to the bifurcated ends 58 of rod 60 of actuator 26. Outboard of the ends 58 are two coupler links 24.

Each coupler link 24 includes a first end 46 connected to a second end 38 of input link 20 through the bifurcated ends 58 of actuator rod 60. Each coupler link 24 also includes a second end 48 having a bore 50 in which a rod 52 is received to connect the second ends 48 to receiving members 56 on side walls 28 of the movable section 16. Thus, the coupler links 24 join the second end 38 of input link 20 to the second end 78 of an output link 22, integral to the movable section 16.

The movable section 16 is rotatably connected to the stationary section 14 by trunions 62, 64 through openings 66, 68 in each side wall 18, 28, respectively. Each sidewall 28 is positioned outboard of one of the sidewalls 18 of stationary section 14. Trunions 62, 64 pass through opposing openings 66 of the stationary section 14 and opposing aligned openings 68 of the movable section 16. Washers 70 and screws 72 lock the sections 14 and 16 together. The line extending between the connection at trunions 62, 64 of movable section 16 and the connection at receiving members 56 of movable section 16 form the integral output link 22 (see FIGS. 3-5).

The output link 22 may, however be a separate link suitably connected to the movable section 16 so that the movable section 16 moves with the output link 22.

Receiving members 56 ride along access openings 74 when the movable section 16 rotates relative to stationary section 14. A slot in the access openings 74 facilitates assembly of the linkage 10. Spacer 76 slides over rod 52 to maintain ends 48 of coupler links 24 in receiving member 56.

Actuator 26 is a linear actuator, such as a fluid powered cylinder 80, as shown in FIGS. 2 and 3-5 having an extendable and retractable rod 60 with bifurated ends 58. The cylinder 80 is pivotally connected at 4 to the stationary section 14.

Figure 3:
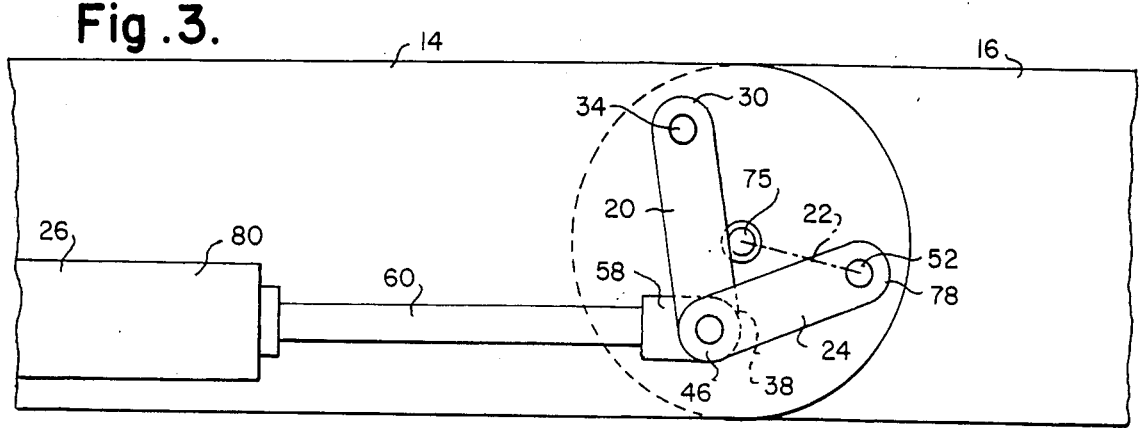
FIG. 3 is a schematic side elevation of the linkage arrangement of the present invention when the movable member is colinear to the stationary member.
Figure 4:
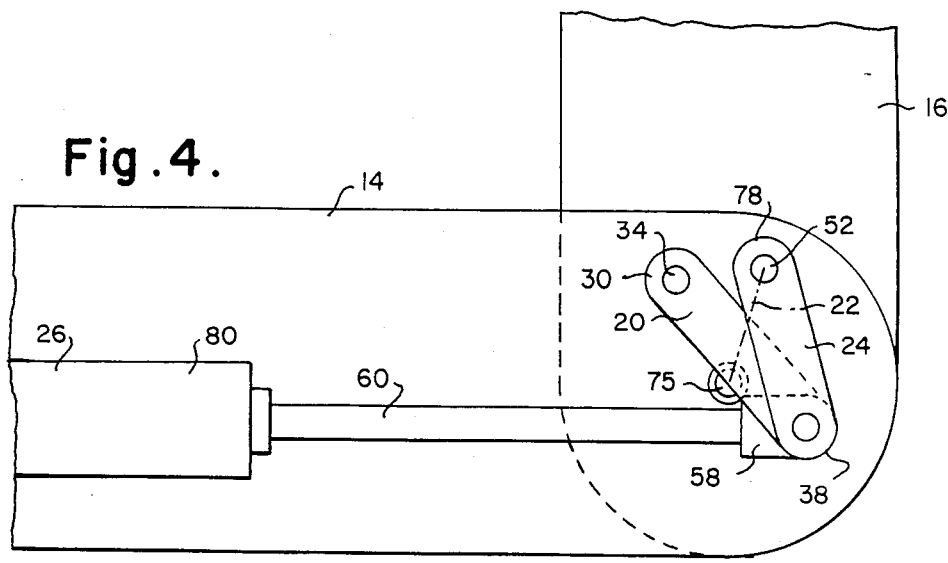
FIG. 4 is a schematic side elevation of the linkage shown in FIG. 3 showing the linkage arrangement when the movable member is rotated to one extreme relative to the stationary member.
Figure 5:
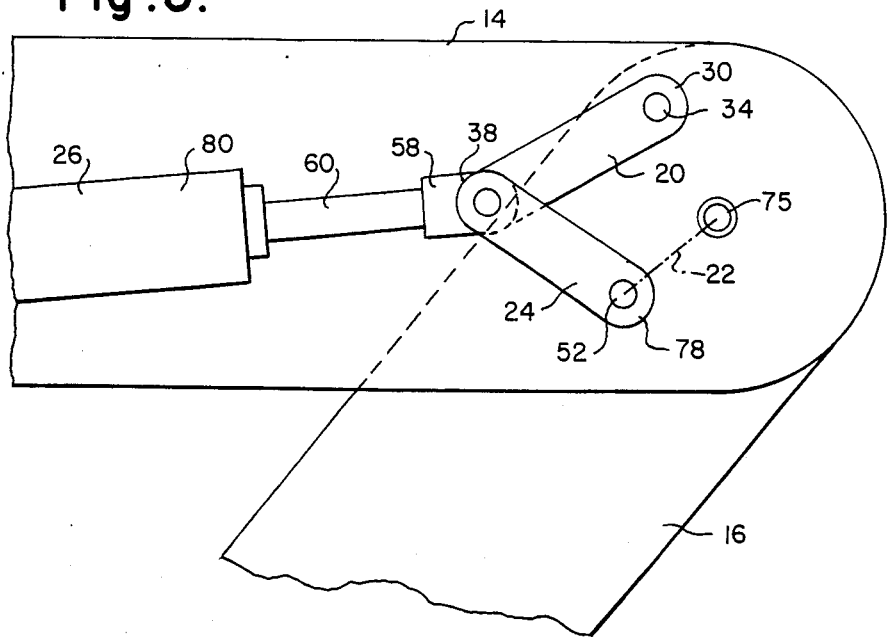
FIG. 5 is a schematic side elevation of the linkage shown in FIG. 3 showing the linkage arrangement when the movable member is rotated to another extreme relative to the stationary member.

Referring to FIGS. 3-5, when actuator rod 60 is fully extended, the end 38 of input link 20 rotates about its end 30 fixed to stationary section 14. Coupler links 24 transfer the moment to the end 78 of output link 22 of movable section 16.

The length of each link remains constant and the distance and orientation between the fixed end 30 of input link 20 and the fixed end 75 of output link 22 remains constant. Thus, movable section 16 is rotated upwardly at about a 90° angle relative to stationary section 14 when actuator rod 60 is in an extended position.

When acutator rod 60 is retracted, as shown in FIG. 5, the end 38 of input link 20 is rotated back, towards the actuator 26, thereby pulling the coupler links 24 and the end 78 of output link 22 to rotate the output link 22 about its fixed end 75. Thus, movable section 16 rotates downwardly at an acute angle relative to stationary section 14. FIG. 3 shows an intermediate position in which the movable section 16 is colinear relative to stationary section 14.

The length of input link 20 is greater than the length of output link 22 so that rotation of the input link 20 about its fixed end 30 causes coupler links 24 to rotate output link 22 about its fixed end 75 through a greater angle of rotation than that of the input link 20. In the preferred embodiment, each coupler link 24 is longer than the output link 22.

Figure 7:
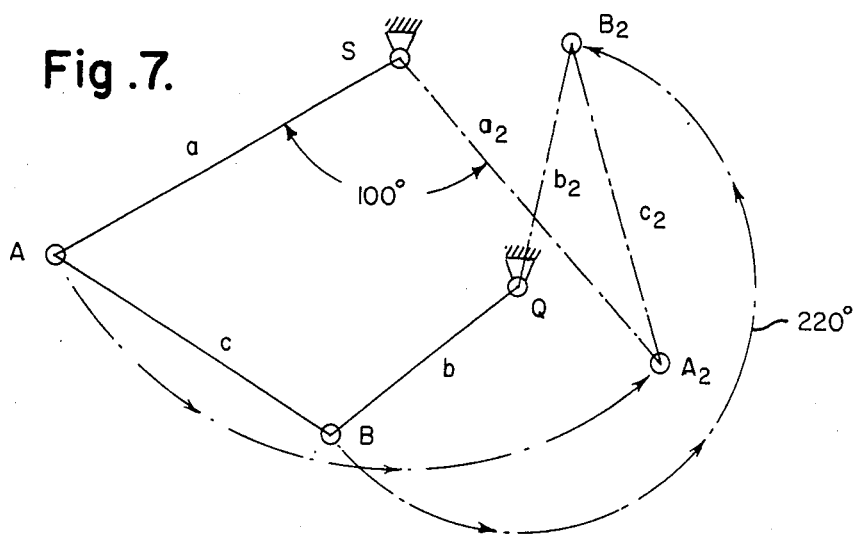
FIG. 7 is a geometric view of the range of motion of the linkage of the present invention.

The high angle link hinge rotates high torques through large angles. FIG. 7 is a geometric illustration of the extreme positions shown in FIGS. 4 and 5. "A" represents the connection between the actuator rod 60 and the end 38 of input link 20. "B" represents the connection between the coupler link 24 and the output link 22. "Q" represents the connection between the stationary and movable sections 14 and 16, respectively, at the fixed end 75 of output link 22. "S" represents the connection between stationary section 14 and the fixed end 30 of input link 20. S and Q are fixed points. A and B move through arcs having centers at S and Q, respectively. The input link 20 is represented by link a, $a_2$; the coupler link 24, by link c, $c_2$; and the output link 22, by link b, $b_2$, where A, B, a, b and c approximate the arrangement shown in FIG. 5 and $A_2$, $B_2$, $a_2$, $b_2$ and $c_2$ approximate the arrangement shown in FIG. 4. As FIG. 7 illustrates, for a 100° rotation of input link 20 from a to $a_2$ there is a corresponding rotation of 220° for output link 22 from b to $b_2$. Thus, a relatively small linear movement in actuator rod 60 transmits torque from a small angular input to about a twofold angular output. It is believed that heretofore, angular outputs of this magnitude could be achieved only by use of gear type power transmission elements. The link and pin power transmission elements offer advantages over gear type elements in the ease of manufacture and assembly, lower cost and ultimate strength. Further, the link and pin arrangement requires less space than the gear type arrangement. The compact linkage lends itself to surgical table design.

Of paramount importance in designing a specific linkage arrangement for a specific application are the geometric and force relationships of the link and pin elements. Once the applied hinge torque at the required hinge angles are known, the input actuator force as well as the forces and torques associated with each link, pin and bearing must be ascertained. FIGS. 8 through 11 are geometric illustrations to be used in the following geometry and force analyses.

Figure 8:
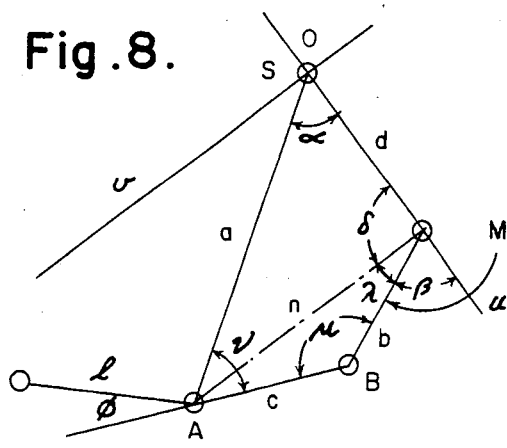
FIG. 8 is a geometric illustration of the linkage in a cartesian coordinate system u-v having its origin at point "0"

Referring to FIG. 8, link d is ground and is integral with the stationary section 14. Similarly, output link b is integral with the movable section 14. M is the externally induced moment working about point Q on output link b. A cartesian coordinate system u-v is defined with its origin at 0, as shown. The angles and lengths are noted alphabetically.

For the purpose of analysis, the angle of the input link, a, is the independent variable. It is assumed that the lengths of all links (a, b, c. d) and the coorindates $u_4$, $v_4$ of the fixed pivot point 4 of the linear actuator are known. This analysis will give expression for all other angles as well as the linear actuator length, 1.

First, line n is acknowledged and the Law of Cosines is applied to triangles nad and nbc.

The distance n is found from $$n^2 = a^2 + d^2 - 2ad\cos\alpha \tag{1}$$

or $$n = \sqrt{a^2 + d^2 - 2ad\cos\alpha} \tag{2}$$

Angel $\mu$ is next determined.

$$n^2 = b^2 + c^2 - 2bc\cos\mu \tag{3}$$

$$\mu = \cos^{-1}\left(\frac{b^2 + c^2 - n^2}{2bc}\right) \tag{4}$$

where n is as found in Equation 2.
Similarly, angles $\delta$ and $\lambda$ are found $$a^2 = n^2 + d^2 - 2nd\cos\sigma \quad (5)$$

or $$\sigma = \cos^{-1}\left(\frac{n^2 + d^2 - a^2}{2nd}\right) \quad (6)$$

and $$c^2 = n^2 + b^2 - 2nb\cos\lambda \quad (7)$$

or $$\lambda = \cos^{-1}\left(\frac{n^2 + b^2 - c^2}{2nb}\right) \quad (8)$$

Angle v may now be found by knowing that the sum of the angles of triangles nbc adn nad is each. Therefore, $$v = (\pi - \alpha - \sigma) + (\pi - \lambda - \mu) \quad (9)$$

or $$v = -(\alpha + \sigma + \lambda + \mu) \quad (10)$$

Angle $\beta$ is a reference angle of output link b to the u-axis. It can be found simply as $$\beta = \pi - \sigma - \lambda \quad (11)$$

The coorindates of all points of the linkage may now be found by elementary trigonometry. The results are summarized below.

| | | |
|---|---|---|
| $u_O = 0$ | $v_O = 0$ | (12) |
| $u_Q = d$ | $v_Q = 0$ | (13) |
| $u_A = a\cos\alpha$ | $v_A = a\sin\alpha$ | (14) |
| $u_B = d + b\cos\beta$ | $v_B = b\sin\beta$ | (15) |
| $u_4$, known | $v_4$, known | (16) |

Simple analytical geometry can now be applied to find actuator length 1 and its angle to the coupler link, $$l = \sqrt{(u_4 - u_A)^2 + (v_4 - v_A)^2} \quad (17)$$

$$\phi = \tan^{-1}\frac{v_4 - v_A}{u_4 - u_A} \quad (18)$$

All values relating to the geometry are now known as a function of link lengths and the angle of the input link. This information is essential to proceed with the static force analysis.

It must be realized however, that the sign of the right hand side of equations (2), (4), (6), and (8) may be plus or minus. The decision regarding the sign of these expression must be made by close scrutinization of the linkage and its configuration.

It is required to know, for a given induced moment, and for any linkage position, the forces on all links and pins as well as the actuator. This analysis assumes a pure moment about point Q (no vertical shear force on link b). Friction at the pivot points is neglected as well. Those skilled in the art will be able to make the necessary adjustments for nonideal situations.

FIG. 8 shows the linkage and the nomenclature required for this analysis. The moment M is about point Q and, at any given position, is restrained by the links reacting against each other and the stationary and moving members of the hinge. Free body diagrams of each link and junction are shown in FIGS. 9-11.

Summing the moments about point Q, $$M_Q = 0 = B_T b - M \quad (90)$$

or $$B_T = M/b \quad (20)$$

Figure 9:
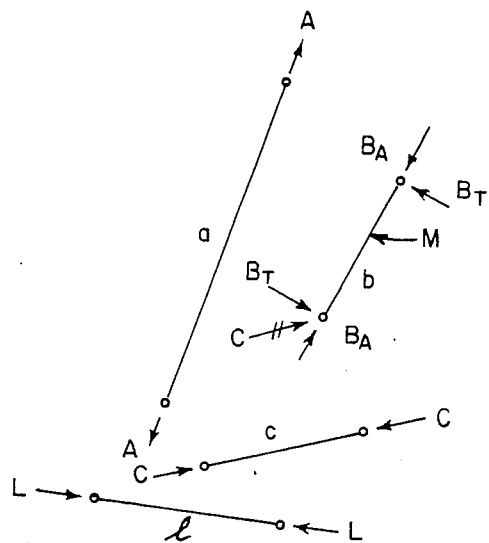
FIGS. 9 through 11 are geometric illustrations of each link and junction to aid in force analysis.
Figure 10:
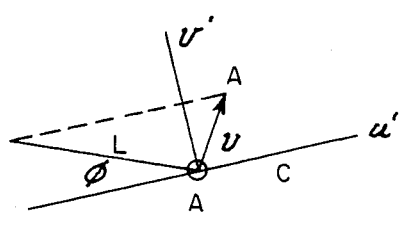
Figure 11:
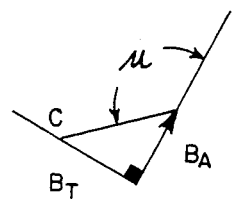

At point B, it can be seen FIGS. 9 and 11 that $$B_T = C\sin(\pi - \mu) \quad (21)$$

or $$C = \frac{M}{b}\left(\frac{1}{\sin\mu}\right) \quad (22)$$

and $$B_A = -C\cos(\pi - \mu) = \frac{M}{b}\left(\frac{1}{\tan\mu}\right) \quad (23)$$

$B_A$ and $B_T$ are the axial and tangential reaction forces at point Q. Force C is the axial load on coupler link c. Since friction is neglected, there is no tangential force on this link, or any other link yet to be examined.

The free body diagram of point A involves three forces, C, A, and L. In FIG. 10, a coordinate system u'v' is created with axis u' colinear with link c and origin at point A. Summing forces along theses axis.

$$\Sigma Fu' = 0 = -C + L\cos\phi + A\cos v \quad (24)$$

$$\Sigma Fv' = 0 = -L\sin\phi + A\sin v \quad (25)$$

Force C is known as well as the angles; L and A are to be determined. From the latter equation, $$A = L\frac{\sin\phi}{\sin v} \quad (26)$$

Inserting this into the first, $$-C + L\cos\phi + L\frac{\sin\phi}{\sin v}\cos v = 0 \quad (27)$$

which may be rearranged, using equation (22), to $$L = \frac{M}{b}\left(\frac{1}{\sin\mu\cos\phi}\right)\left(\frac{1}{1 + \frac{\tan\phi}{\tan v}}\right) \quad (28)$$

This is the axial force on the actuator. Using this in Equation (26), $$A = \frac{M}{b}\left(\frac{1}{\sin\mu\cos\phi}\right)\left(\frac{1}{1 + \frac{\tan\phi}{\tan v}}\right)\left(\frac{\sin\phi}{\sin v}\right) \quad (29)$$

$$A = \frac{M}{b}\left(\frac{\tan\phi}{\sin\mu\sin v}\right)\left(\frac{1}{1 + \frac{\tan\phi}{\tan v}}\right) \quad (30)$$

which is the axial load on link a.

All link and pin forces, as well as the actuator force, have now been determined.

When the linkage 10 of the present invention is used in a surgical table 12, characteristics such as size, appearance, cleanability and prevention of fluid ingress to internal mechanisms, elimination of pinch points, and minimal lash are important. The size of the hinge is determined by a combination of facts including the ultimate strength requirements, the power source, the required angle of articulation, the operating loads, and the strength of materials used.

To accomodate the interest in appearance, cleanability and the elimination of pinch points, the stationary and movable sections 14 and 16, are joined by means of the dual sidewalls 28 on the movable section 16 flanking each outboard side of the stationary section sidewalls 18. The arrangement eliminates outward holes, fasteners, sharp edges and pinch Minimizing mechanical lash, while not always important for strength considerations, is important to surgical table design especially if the hinge load can go "over center" and the hinge moment is at or near zero. Lash under these conditions can result in the hinge teetering from lock to lock. The lash comes primarily from the looseness of the various pins in their respective holes and bearings. The degree of lash for a given quality of pin fit is highly dependent on the geometry of the links. Therefore, the lash will be different for a given hinge in one position or another. High precision pins, holes, and bearings are desirable to minimize lash.

What is claimed is:

1. In an apparatus having a first member rotatably connected at a joint to a second member, a linkage for transmitting torque comprising:
   said second member having two first parallel spaced side walls, each said side wall having access openings;
   said first member having two second parallel spaced side walls rotatably mounted outboard of said first sidewalls of said second member;
   an input link having one end rotatably mounted to said second member between said first sidewalls and a second end;
   means for applying a moment to said input link about said one end of said input link;
   an output link having one end rotatably mounted to said joint and a second end, said output link being so operatively connected to said first member that said first member moves with said output link;
   a coupler link having a first end connected to said second end of said input link and a second end connected to said second end of said output link, said coupler link being pivotally mounted through said access openings in said second member to said first member;
   the length of said input link being greater than the length of said output link so that rotation of said input link about its one end causes said coupler link to rotate said output link about its ones end through a greater angle of rotation than that of said input link.

2. The linkage recited in claim 1 wherein said output link is integral to said first member.

3. The linkage recited in claim 1 wherein said moment applying means is a linear actuator.

4. The linkage recited in claim 1 wherein the length of said coupler link is less than the length of said input link.

5. The linkage recited in claim 1 wherein said moment applying means is a fluid powered cylinder having one end fixed to said second member and another end in the form of an extendable and retractable rod connected to said second end of said input link.

6. The linkage recited in claim 1 wherein said first member is a movable member and said second member is a stationary member.

7. The linkage recited in claim 1 wherein said movable member is rotatably mounted to said stationary member by means of a pair of opposing trunions mounted between adjacent first and second side walls.

8. The linkage recited in claim 1 wherein said first member is a stationary member and said second member is a movable member.

9. The linkage recited in claim 1 wherein said coupler link includes two link members, each link member being mounted at its respective said first end to opposing sides of said second end of said input link.

10. The linkage recited in claim 9 wherein said moment applying means is a fluid powered cylinder having an extendable and retractable rod, said rod having a bifurcated end for mounting each said first end of said two link members to said second end of said input link.

11. A linkage for transmitting torque comprising:
    a stationary member having two first parallel spaced side walls, each said first side wall having access openings;
    a movable member having two second parallel spaced side walls, each second side wall being rotatably mounted to the opposing outboard side of one of said first side walls of said stationary member;
    an input link having one end rotatably mounted to said stationary member between said first side walls and a second end;
    a coupler link between said first side walls having a first end pivotally mounted to said second end of said input link and a second end pivotally mounted through said access openings to said movable member; and
    means for applying a moment about the rotatable mounting of said one end of said input link to said stationary member, said moment being transferred through said coupler link to said movable member.

12. The linkage recited in claim 11 wherein the length of said input link from the rotatable mounting at said one end to the pivotal mounting at said second end is greater than the length of said movable member from the rotatable mounting of said second side walls to the pivotal mounting to said second end of said coupler link, so that rotation of said input link causes said coupler link to rotate said movable member through a greater angle of rotation than that of said input link.

13. The linkage recited in claim 11 wherein said moment applying means is a fluid powered linear actuator having an extendable and retractable rod, said rod being mounted to said second end of said input link and to said first end of said coupler link.

14. The linkage recited in claim 11 wherein said coupler link includes two opposing link members, each link member having a said first end, each said first end being mounted to an opposing outboard side of said second end of said input link, and each link member having a second end, each said second end being mounted to an opposing second side wall of said movable member.

* * * * *

UNITED STATES PATENT AND TRADEMARK OFFICE
CERTIFICATE OF CORRECTION

PATENT NO.   :   4,706,511
DATED        :   November 17, 1987
INVENTOR(S)  :   John C. Houston It is certified that error appears in the above-identified patent and that said Letters Patent is hereby corrected as shown below:

Col. 5, line 17, delete "adn" and substitute therefor --and--.
Col. 5, line 17, after "is" insert -- $\pi$ --.
Col. 5, line 40, after "link," insert -- $\phi$ .--.
Col. 7, line 18, after "pinch" insert --points.--
Col. 7, line 59, delete "ones" and substitute therefor --one--.
Col. 6, line 5, "(90)" should be --(19)--.

Signed and Sealed this

Sixteenth Day of August, 1988

Attest:

DONALD J. QUIGG

*Attesting Officer*    *Commissioner of Patents and Trademarks*